Aug. 7, 1962  S. A. FRANCIS  3,048,699
METHOD AND APPARATUS FOR MEASURING ABSORPTION SPECTRA
Filed May 15, 1958  3 Sheets-Sheet 1
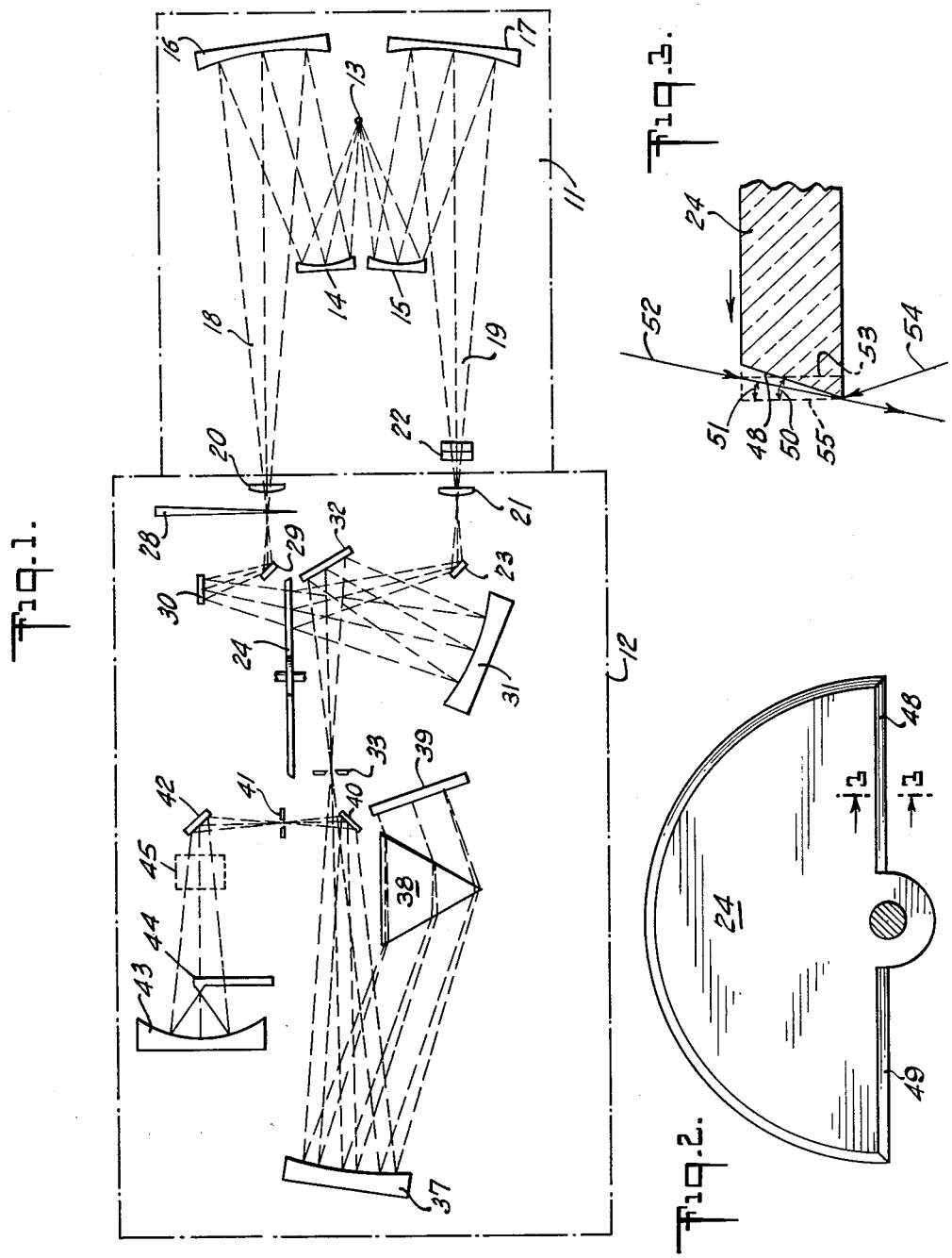

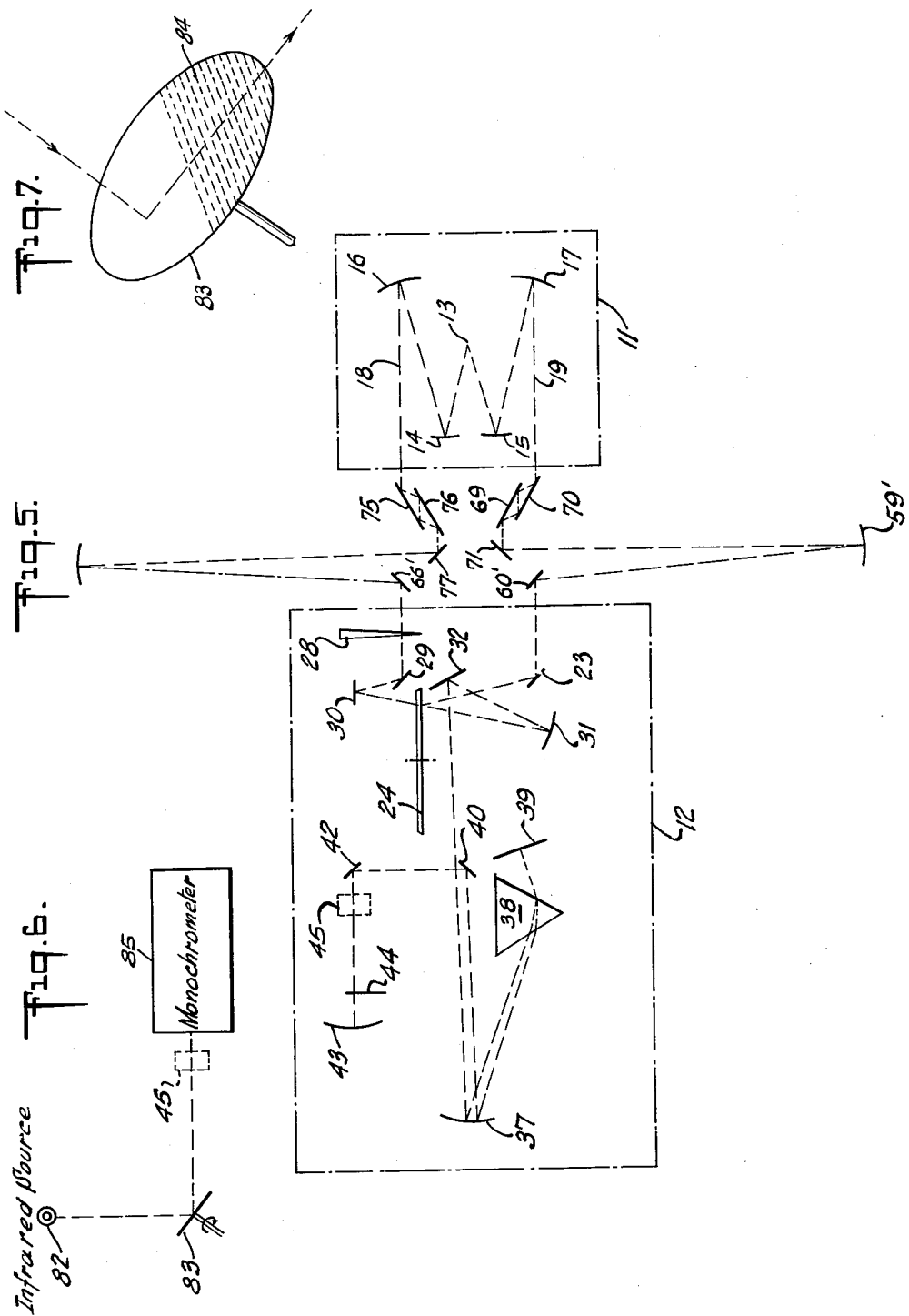

United States Patent Office

3,048,699
Patented Aug. 7, 1962

1

3,048,699
METHOD AND APPARATUS FOR MEASURING
ABSORPTION SPECTRA
Stanley A. Francis, Fishkill, N.Y., assignor to Texaco Inc.,
a corporation of Delaware
Filed May 15, 1958, Ser. No. 735,550
5 Claims. (Cl. 250—83.3)

This invention is concerned with a method and apparatus employing infrared spectrometers. More specifically, the invention deals with infrared spectrometry wherein there is employed a reflection technique, such reflection technique being employed to investigate absorption spectra of thin films on reflecting surfaces.

In infrared spectrographic work, it is well known to employ an infrared beam of energy that is transmitted through a sample which is to be investigated. However, in certain fields of investigation the chemical conditions at the surface of a substance are of interest, particularly where there is a thin layer of another substance thereon. For example, the field of lubrication is one where such conditions are of interest since the lubricant is most often employed in contact with a metal surface. The thickness of the thin layer of concern here, may be on the order of molecular thicknesses, e.g. down to one half molecular layer.

Thus it is an object of this invention to provide a method of infrared absorption in order to obtain a spectrum, where a beam of infrared energy is reflected from a surface of one substance having a very thin film of another substance thereon, e.g., by chemi-sorption, such as, where a layer of carbon monoxide gas has been chemi-sorbed on a reflecting surface of platinum, or by any feasible means for depositing any sort of film on a reflecting metal surface, e.g., soaps or long chain alcohols.

Another object of this invention is to provide improved infrared spectrophotometer apparatus having high sensitivity.

Another object of this invention is to provide improved infrared spectrographic apparatus, particularly a double beam spectrophotometer, which spectrophotometer uses plural reflections through a thin film of one material located on a reflecting surface of another material, thus to be able to obtain a spectrum of the thin film material.

Another object of this invention is to provide an improvement in a double beam spectrophotometer so as to obtain increased sensitivity by eliminating a blanking effect caused by the thickness of the sector mirror as it rotates to alternately pass the two beams for spectral comparison.

Briefly, the invention concerns a method of measuring the infrared absorption spectrum of a very thin film of one substance on the surface of another substance. The method comprises the steps of reflecting a beam of infrared energy at an acute angle of incidence relative to the surface of said other substance, said beam passing through said film of the one substance. The method also comprises the step of reflecting a beam of infrared energy from the same source at an equal angle of incidence relative to the surface of said other substance alone, and comparing after reflection the energy in said beams over a given spectrum, in order to study the properties of said film.

The invention may be also briefly characterized as a combination for use in a double beam spectrophotometer, the spectrophotometer providing means for measuring the absorption spectrum of a very thin film of one substance on the reflecting surface of another substance. The combination also comprises means for reflecting one beam of said spectrophotometer from a reflecting surface of said other substance and means for reflecting the other beam of said spectrophotometer from said first named reflecting surface, having said very thin film thereon. In addition, the combination comprises means for comparing said beams after reflection in order to determine said absorption spectrum.

The foregoing and other objects and benefits of the invention are set forth in greater detail below, and are illustrated in the drawings, in which:

FIG. 1 is a schematic diagram, showing the optical system of a standard double beam spectrophotometer including improved elements in accordance with the invention;

FIG. 2 is an enlarged detail plan view showing the sector mirror employed in the system of FIG. 1;

FIG. 3 is a further enlarged fragmentary cross-section view taken along the lines 3—3 of FIG. 2;

FIG. 5 is a schematic diagram showing the optical system of FIG. 1, including different additional elements according to another embodiment of the invention;

FIG. 6 is a schematic diagram illustrating the elements employed in accordance with yet another embodiment of the invention; and FIG. 7 is an enlarged perspective view showing the rotating mirror element of the FIG. 6 modification.

Figure 4:
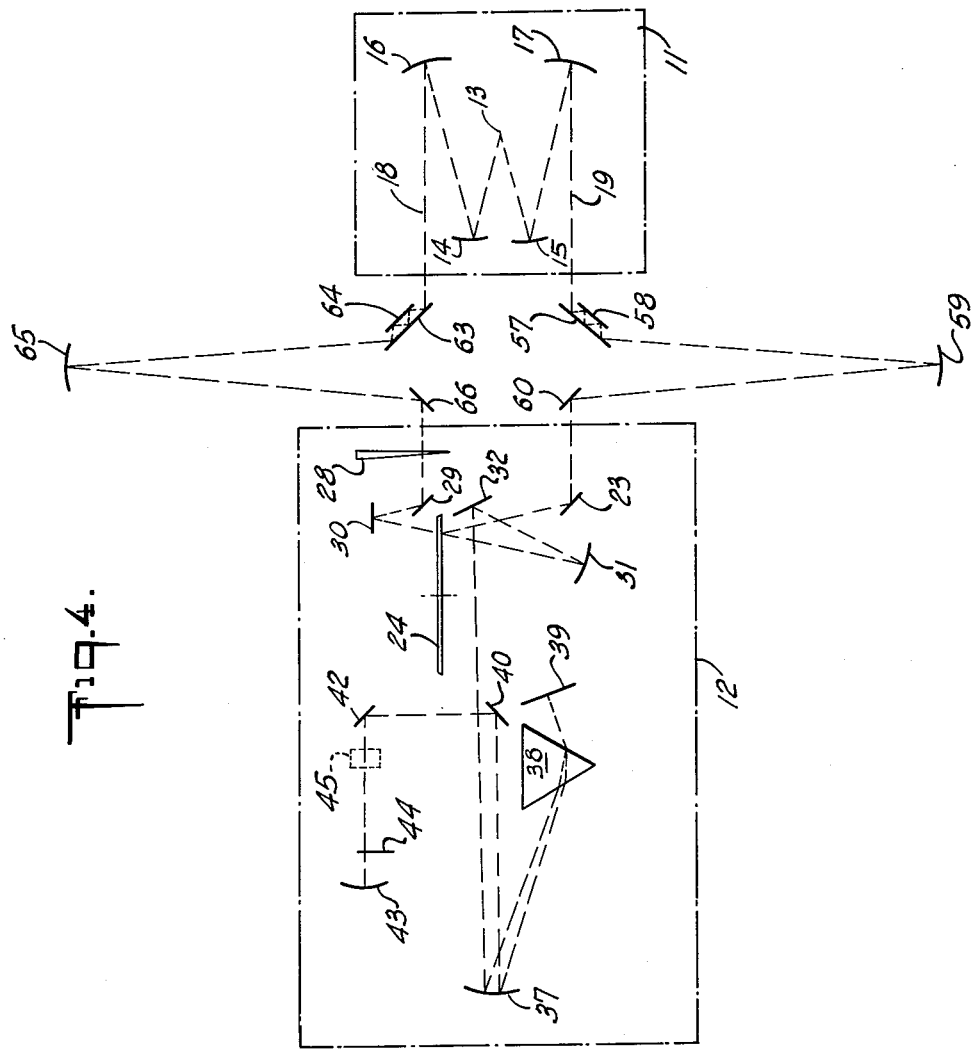
FIG. 4 is a schematic diagram showing the optical system of FIG. 1, including additional elements according to one modification of the invention.

In general, this invention employs infrared spectrophotometry to analyze the chemical structure of given substances by determining the percent absorption of infrared energy over the normal band of frequencies that may be characterized as being infrared. Such procedure and apparatus, as applied to the field of petroleum, has been described in an article by C. K. Buell, F. W. Crawford and C. H. Mathis published in the Mines Magazines, December 1945, pages 667–676. This article does not describe the use of a double beam spectrophotometer, but it provides a general description of how infrared spectrophotometry is applicable to studying the properties of given materials, e.g., hydrocarbons.

In this invention the applicant basically makes use of a standard type of double beam spectrophotometer, to which has been applied the improvements in accordance with this invention.

This, referring to FIG. 1, it is pointed out that the schematic optical system diagram may be divided into two main elements. One of these elements is the infrared source containing portion 11 of the system, while the other portion 12 includes the various spectrum elements which are included within a separate dashed line box.

Within the source portion 11 of the system there is included a source 13 of infrared energy. This may be any feasible source, e.g. a Nernst glower. There is a shield structure (not shown) with two slits, which provides a pair of beams 18 and 19 of infrared energy, which are indicated by dashed lines. Beams 18 and 19 are reflected from concave mirrors 16 and 17 respectively, after which they are focused through a pair of lenses 20 and 21 which are located on the spectrum portion 12 of the spectrophotometer.

There is illustrated a sample 22 in the lower beam 19. This is a standard arrangement, where the sample is penetrated by the beam of infrared energy.

Within the spectrum portion 12 of the system, the sample beam 19 is reflected from a plane mirror 23 and travels upward when viewed as (illustrated in FIG. 1) to either pass on into space, or to be reflected from the mirrored surface of a sector mirror 24, depending upon the rotational position of the mirror 24. At the same time, the reference beam 18 of infrared energy which has passed through lens 20, is variably attenuated by a so-called "optical wedge" 28. The position of wedge 28 relative to beam 18, is shifted by a servo-motor (not shown) in order to attenuate the reference beam 18 so as to match the sample beam 19 at any given frequency of the spectrum. In this manner, the position of the wedge may be calibrated in terms of the percentage absorption of the energy in the sample beam 19, since it is continuously driven to a position where the amount of energy of reference beam 18 that is allowed to pass, is equal to the amount of energy in the sample beam 19.

The path of the reference beam 18 then continues past the wedge 28 to a plane mirror 29, and then upward to be again reflected from another plane mirror 30 downward over a path which reaches the concave reflecting surface of a mirror 31, if sector mirror 24 is in a rotational position such that it does not intercept this portion of the beam. Thus, when the beam 18 is allowed to reach concave mirror 31, it is reflected back up to a plane mirror 32 from whence it is reflected through a slit 33 that is located in the vicinity of a converging or image point in the beam path.

Returning to the sample beam 19; after it has been reflected from mirror 23 upward to the location of rotating sector mirror 24, it is reflected from the lower surface of sector mirror 24 downward to the concave reflecting mirror 31 whenever the sector mirror 24 is located in a position to intercept the beam. Furthermore, it will be noted that whenever sector mirror 24 intercepts the sample beam 19 so as to reflect it downward onto mirror 31, it acts at the same time to intercept and block the passage of the reference beam 18 which is being directed downward from mirror 30 toward the same concave mirror 31. Consequently the operation of the system is such as to alternately pass the sample and reference beams at the frequency of rotation of the sector mirror 24.

Continuing to follow the paths followed by the alternate beams, it will be observed that after they have been reflected from plane mirror 32 and passed through the slit 33, they are reflected from another concave mirror 37. From mirror 37 the beams are directed through a prism 38 and are bent so as to emerge and be directed for reflection back again from a plane mirror 39. Now the beams are returned through prism 38 once more but with diverging dispersal back onto concave mirror from whence they are directed to a plane mirror 40 and reflected through a spectrum, or frequency determining, slit 41; after which they are directed to another plane mirror 42 from which they are reflected onto an elliptical focusing mirror 43 which acts to focus the energy at the location of an infrared sensitive thermo-couple detector 44.

There may be a polarizer 45 inserted in the beam optically in front of the thermo-couple 44 to substantially exclude the radiation having its electric vector vibrating in a given plane. This will normally be used with surface investigations employing reflection, as will be more fully explained below. The polarizer may take any feasible form, e.g. a series of six silver chloride plates oriented so that the normal to the plates is inclined at an angle of sixty-three degrees to the beam direction. Such a polarizer has been described in an article by Roger Newman and Ralph S. Halford, in "Review of Scientific Instruments," volume 19, page 270 (published in 1948).

Referring to FIGS. 2 and 3, it is pointed out that the sector mirror 24 is not constructed in accordance with the structure used in a standard spectrophotometer, but has the radial edges 48 and 49 beveled in order to provide instantaneous change-over action as the beam 18 is cut off and replaced by the beam 19 which is reflected from the lower surface of mirror 24. This beveled edge structure overcomes a blanking effect which would otherwise be caused by the thickness of the mirror structure, as clearly illustrated in detail in FIG. 3. Such blanking effect would cause a sharp energy cut-off signal at the frequency of the rotation of mirror 24. This is caused by the relative locations of the mirrors which determine the paths of the beams 18 and 19, and the location of the sector mirror 24. Thus either the leading or the trailing edge of the mirror 24 would act to cause this hiatus in the transmission of one beam or the other, and the unwanted signal thus produced merely tends to overload the amplifier involved.

As indicated in FIG. 3, the radial edge 48 of the mirror 24 is beveled so as to eliminate the triangular portion indicated in dotted lines. Thus, the above indicated undesirable system-frequency signal is eliminated by this beveled edge structure. It is pointed out that the plane of the beveled edge 48 should lie at an angle 50 that is greater than an angle 51 which is the angle that an axis 52 of the beam 18, makes with the plane of an edge of an unbeveled mirror.

The beveled edge structure thus provides a condition such that there is no appreciable time during which the standard beam 18 (the axis of which is indicated by the arrow 52) will be cut off, prior to the time when sample beam 19 (the axis of which is indicated by an arrow 54) will be reflected from the mirror surface of sector mirror 24. The blanking effect would have been created at the leading edge of sector mirror 24, in the case illustrated in FIG. 3, since the mirror 24 is moving in the direction indicated by the arrow, relative to the beam axes 52 and 54. Thus, if the mirror 24 had had a square edge, as indicated in dashed lines, it would have cut-off the axis 52 when it reached a position indicated by dashed line 53. But, it would not have begun to reflect along axis 54 until the mirror 24 reached the later position indicated by a dashed line 55.

Referring to FIG. 4, there is illustrated with a single line optical beam diagram, the same two main portions of the spectrophotometer illustrated in FIG. 1, i.e., the source portion 11 and the spectrum portion 12. In addition there is an arrangement which includes a pair of parallel reflecting-surface elements 57 and 58. These elements are positioned in the path of the sample beam 19 and the reflecting surfaces thereof are covered with the very thin layer of material that is to be investigated. With this arrangement the beam is reflected a plurality of times through the thin film of material and is absorbed thereby a greater amount than would be true with only a single reflection through the film. The beam 19 continues from the reflector 57 outward to a concave mirror 59 and back to a plane mirror 60, from whence it is directed into the system at the same location as it was in the FIG. 1 illustration. Thus, it is directed onto the plane mirror 23 and then continues through to effect the thermocouple 44 during each half cycle, as previously indicated.

At the same time, the other beam 18 is directed onto a similar pair of reflecting surface elements 63 and 64, of the same reflecting material as reflecting elements 57 and 58. However, reflectors 63 and 64 are not coated with the very thin layer or film of material to be investigated. This standard beam 18 leaves reflector 63 and travels outward to a concave mirror 65 to be reflected back to a plane mirror 66, from whence it is reflected into the same path as it took in the FIG. 1 illustration. Thus, the standard beam 18, is directed to impinge upon the wedge 28 which determines what percentage of the energy contained in this beam that is allowed to pass and be reflected from the mirror 29, to thereafter continue through the system and effect the thermocouple 44 during the half cycles of the sector mirror 24 rotation when the mirror does not intercept.

It has been discovered that the percent absorption by a thin film on a reflecting surface, may be substantially increased by polarizing the infrared energy beams by using the polarizer 45 as indicated above. The orientation of the polarizer is such that the radiation, the electric vector of which vibrates in a direction perpendicular to the plane of incidence of the reflected beam, is substantially rejected. At the same time the radiation, the electric vector of which vibrates in the plane of incidence of the reflected beam, is substantially unaffected. The explanation for this lies in the fact that the radiation of the beam may be treated as consisting of approximately equal amounts of radiation having the electric vectors thereof vibrating in the plane of incidence and in a plane perpendicular thereto, as indicated above. And the latter radiation (perpendicular to the plane of incidence) has no appreciable component of electric intensity at the surface because of the phase change of nearly one hundred and eighty degrees which occurs upon reflection. Thus this component cannot be absorbed by the film on the surface. Therefore, by polarizing the beam so as to discard that component that is not reduced by absorption at all, the ratio of the quantity absorbed to the quantity left after polarization is increased over the ratio of the same quantity absorbed to the total quantity of the radiant energy in the beam without polarization. In other words the denominator of the ratio has been made smaller while the numerator has remained the same.

It is to be noted that the plane of incidence, is that plane which contains the reflected beam both before and after it is reflected from the reflecting surface.

FIG. 5 again illustrates the same source and spectrum portions 11 and 12 as in FIGS. 1 and 4. However this modification involves a change with regard to the reflecting surfaces for carrying the thin layer of material to be investigated, thereon. There is a pair of reflecting material elements 69 and 70. These act similarly to elements 57 and 58 of FIG. 4, and are likewise coated with the thin layer or film of material that the sample beam 19 is to penetrate. In this modification the reflecting elements 69 and 70 are so placed that the angle of incidence of the sample beam is much higher than was the case in the FIG. 4 modification. Specifically the angle of incidence employed in the FIG. 5 modification is seventy-two degrees. This is of benefit since up to a certain maximum angle of incidence (about eighty degrees) the percent absorption that is gained from the passage of the beam through the thin surface layer of material is increased, and consequently more satisfactory results are obtainable when a high angle of incidence is employed. With this arrangement there is an additional plane mirror 71 which reflects the beam 19 as it leaves reflector 69, to send it outward to the concave mirror 59' that corresponds with mirror 59 of FIG. 4. Then the beam is returned to a plane mirror 60' that corresponds with mirror 60 of FIG. 4. This reflects the beam 19 into the comparison, spectrum portion 12 of the spectrograph system.

It is pointed out that the angle of incidence referred to herein is that angle which a beam or ray makes with a perpendicular to the reflecting surface at the point of reflection of the ray from the surface.

The standard beam 18 is treated in a similar manner, by having a pair of reflecting surface elements 75 and 76 which, however, are not coated with the very thin layer of material; but which, as before, merely act to provide the same treatment for the standard beam 18 as is applied to the sample beam 19 with the exception of the very thin layer of material that is to be investigated. Also similarly, the standard beam 18 is reflected from a plane mirror 77 outward to a concave mirror 65' and back to a plane mirror 66', before passing into the comparison portion of the spectrograph, as before.

It is pointed out that the arrangement according to FIG. 5, like FIG. 4, also employs a plurality of reflections for the beam as it penetrates the very thin material. In addition the FIG. 5 system employs a high angle of incidence, i.e., in the range of about sixty degrees or better.

Referring to FIGS. 6 and 7, there is schematically illustrated still another embodiment of the invention. This embodiment makes use of the reflection of a beam of infrared energy from a surface that is coated with a very thin layer of material to be investigated; however, in this case, the manner of investigating the material is carried out by having a source of infrared energy 82 direct a beam onto the surface of a rotating circular mirror 83, at a point radially off-set from the center of the mirror. Mirror 83 is constructed of whatever base material it is desired to employ as a base reflector of the infrared energy. This material is then polished and coated with a very thin layer of other material over half of its reflecting surface area, as indicated at the half 84 of mirror 83, that is illustrated in FIG. 7.

In this manner, the beam of infrared energy that is directed onto the reflecting surface of mirror 83 will be reflected for half of each revolution of the mirror 83 from the reflecting surface of the material in an uncoated state, while during the other half of the rotation of mirror 83 this beam will be reflected from the same material with the additional penetration of the very thin layer of material which coats half of the mirror 83. In this manner, the reflected beam of infrared energy may be considered as two separate beams that are directed to the input of a monochrometer 85 which may take various forms but which acts to compare the energy level of the reflected beams during each cycle, as created by the revolution of rotating mirror 83. Thus an absorption spectrum of the very thin layer of material on the half 84 of the mirror 83 is obtained, as a difference signal between the energy levels for each half cycle of the mirror rotation. Such absorption spectrum is obtainable in a well-known manner by standard equipment, so that no further details thereof need be given.

It will be noted that the polarizer 45 may be used in the path of the beam to produce an increase in the ratio of the amount of energy adsorbed, to the total energy. This has been explained above and need not be repeated here.

While certain embodiments of the invention have been described above in considerable detail in accordance with the applicable statutes, this is not to be taken as in any way limiting the invention but merely as being descriptive thereof.

It is claimed:

1. A method of measuring the infrared absorption spectrum of a very thin film of one substance on the surface of another substance, comprising the steps of taking two separate samples of said other substance, one sample having said film of said one substance thereon, reflecting a first beam of infrared energy at an acute angle of incidence relative to the surface of said other substance of said one sample, said beam passing through said film of the one substance while being reflected from the surface of said other substance, reflecting a second beam of infrared energy from the same source at an equal angle of incidence relative to a surface of said other sample containing said other substance alone, and polarizing said beams with an orientation to substantially reject the perpendicular component of said infrared energy.

2. A method of measuring the infrared absorption spectrum of a very thin film of one substance on the surface of another substance, comprising the steps of taking two separate samples of said other substance, one sample having said film of said one substance thereon, reflecting a first beam of infrared energy a plurality of times each at an acute angle of incidence relative to the surface of said other substance of said one sample, said beam passing through said film of the one substance as each reflection occurs, reflecting a second beam of infrared energy from the same source at equal angles of incidence relative to surfaces of said other sample containing said other substance alone and for an equal plurality of times, and polarizing said beams with an orientation to substantially reject the perpendicular component of said infrared energy.

3. A method of measuring the infrared absorption spectrum of a very thin film of one substance on the surface of another substance, comprising the steps of taking two separate samples of said other substance, one sample having said film of said one substance thereon, reflecting a first beam of infrared energy at an acute angle of incidence relative to the surface of said other substance of said one sample, said beam passing through said film of the one substance while being reflected from the surface of said other substance, said acute angle of incidence being greater than about sixty degrees, reflecting a second beam of infrared energy from the same source at an equal angle of incidence relative to a surface of said other sample containing said other substance alone, and polarizing said beams with an orientation to substantially reject the perpendicular component of said infrared energy.

4. The invention according to claim 3 wherein said acute angle of incidence is as high as about 80°.

5. The invention according to claim 4 wherein said beams are each reflected an equal plurality of times.

References Cited in the file of this patent

UNITED STATES PATENTS

| | | |
|---|---|---|
| 2,170,435 | Sweeney | Aug. 22, 1939 |
| 2,376,311 | Hood | May 15, 1945 |
| 2,428,796 | Friedman | Oct. 14, 1947 |
| 2,462,946 | Coggeshall | Mar. 1, 1949 |
| 2,547,212 | Jamison et al. | Apr. 3, 1951 |
| 2,690,093 | Daly | Sept. 28, 1954 |
| 2,775,160 | Foskett et al. | Dec. 25, 1956 |
| 2,849,618 | Smith | Aug. 26, 1958 |
| 2,900,866 | Coates | Aug. 25, 1959 |
| 2,960,612 | Koulicovitch | Nov. 15, 1960 |

FOREIGN PATENTS

| | | |
|---|---|---|
| 699,129 | Great Britain | Oct. 28, 1953 |

OTHER REFERENCES

Koller: Infrared Production and Transmission Reflection and Measurement, General Electric Review, March 1941, pp. 167–173.